United States Patent [19]
Miga

[11] Patent Number: 4,488,431
[45] Date of Patent: Dec. 18, 1984

[54] WIND SPEED AND DIRECTION INDICATOR AND ELECTRIC CURRENT GENERATING MEANS

[76] Inventor: Frank W. Miga, 8007 Carey Branch Dr., Fort Washington, Md. 20744

[21] Appl. No.: 384,341

[22] Filed: Jun. 2, 1982

Related U.S. Application Data

[63] Continuation of Ser. No. 175,736, Aug. 6, 1980.

[51] Int. Cl.³ .................. G01W 1/04; G01W 1/02
[52] U.S. Cl. ................................. 73/189; 73/188; 33/364; 33/378; 403/132
[58] Field of Search ............ 403/132; 73/188, 189; 116/28 R, 265, 200; 33/378, 364

[56] References Cited

U.S. PATENT DOCUMENTS

| 914,959 | 3/1909 | Lallie | 73/189 |
|---|---|---|---|
| 2,393,501 | 1/1946 | Brown | 403/132 |
| 2,500,410 | 3/1950 | Hewitt | 33/378 |
| 3,055,215 | 9/1962 | Ivie | 73/188 |
| 3,055,216 | 9/1962 | Wappner | 73/189 |
| 3,068,583 | 12/1962 | Goshen | 33/364 |
| 3,286,358 | 11/1966 | Smokowski | 33/352 |
| 3,785,061 | 3/1978 | Carroll | 33/378 |
| 3,956,831 | 5/1976 | Sibley | 33/364 |
| 4,052,894 | 12/1977 | Pinnell | 73/189 |
| 4,080,826 | 3/1978 | Perretta | 73/188 |
| 4,304,137 | 12/1981 | Mutt | 73/189 |

FOREIGN PATENT DOCUMENTS

| 857279 | 9/1940 | France | 73/189 |
|---|---|---|---|
| 1472487 | 3/1967 | France | 73/188 |
| 655735 | 8/1951 | United Kingdom | 403/132 |

Primary Examiner—Richard R. Stearns
Assistant Examiner—Denis E. Corr

[57] ABSTRACT

This invention relates to a wind direction indicator spherically rotatable about a liquid supported poly axial magnetic compass. The wind direction indicator determines the wind direction without any pivotal support. The wind direction structure is orientated to the reference center of the compass by means of the transparency of the spherically rotating structure. The displacement of the wind direction indicator base upon the wind responsive rudder and wing structure thereon causes the device to give an accurate direction of the wind that may be used during sailboat racing. The spherically rotatable structure or wind direction indicator is independently movable regardless of the mounting of the device on the sailboat or any other support structure. The frictional contact between the boat support structure and the device is minimized because there is no surface to surface contact between the moving elements. The boat heeling, rocking, pitching, or any other movement of the support structure is not transmitted to the wind indicating device. The wind direction indicator device may also have a wind intensity or velocity device that is orientated into the specific direction of the wind having a reference point. A wind force electrical generating structure may be used within the spherical rotatable wind direction indicating device.

9 Claims, 4 Drawing Figures

WIND SPEED AND DIRECTION INDICATOR AND ELECTRIC CURRENT GENERATING MEANS

This application is a continuation-in-part of my earlier filed application Ser. No. 06,175,736 filed Aug. 6, 1980 entitled Wind Direction Indicator for Sailboats.

BACKGROUND OF THE INVENTION

The wind is the major force of power in sailboat racing. Understanding the wind with all its variables, such as shifts, is necessary for success. The windshifts are classified along two distinct classes. Windshifts blowing across the water with a change in direction are called geographic shifts. Geographic shifts fall into three patterns: persistent, oscillating, or random. The second class of windshifts is the velocity or intensity of the shifts.

Understanding and predicting windshifts is one of the most intellectual and important aspects of sailboat racing. Not even NASA scientists care whether the wind will shift five degrees in the next minute, but to sailors this is a vital piece of information.

The key to using windshifts tactically is being able to predict with reasonable accuracy what is going to happen to the wind at any point throughout the race. The better your information concerning the wind, the more accurate and precise your expectations become. Therefore, windshifts are critical, if you have done your homework understanding the windshifts, you will have a better feel of what is to be expected from the wind and consequently will have the most fun and success in using the windshifts tactically.

According to prior art practice, one method of determining wind direction and shifting of the wind while sailing was to employ streamers or a wind vane mounted at various points of the sailboat. During the operation of the boat the wind direction device was continuously looked at for direction and changes or shifts therein. Such streamers and wind vanes were not accurate in showing the direction of the driving force wind. The wind direction was also modified by the speed and direction of the boat itself. Furthermore, with the boat itself angulated to the horizon, as it often is during sailing, the helmsman's difficulties are multiplied. The heeling and rocking of the boat changes the effective area against which the wind can operate on the vane. Therefore, the accuracy of the vane in determining the wind direction is greatly diminished.

In measuring the wind speed, it is assumed that the wind moves solely along the horizontal and along the surface of the earth. When a cup anemometer is used to measure the speed of the wind, wind shifts cause an erroneous reading. Most anemometers are based upon pivotal movement of the elements about an axis.

DISCUSSION OF THE PRIOR ART

In the prior art the wind direction or orientation means were usually pivotly mounted with respect to the sailing structure. The pivotal mounting of the wind direction means or vane was not accurate enough for use on a sailboat structure due to the heeling, rolling, pitching, or rocking of the sailboat. The sailboat motion through its pivotal mounting did affect the accuracy of the wind direction means. In the prior art the wind direction was never measured or orientated with respect to a specific point of reference or magnetic north or a horizontal plane that was parallel to surface frictional relationship of the wind direction means and the pivotal support means.

Anemometers are usually fixed to a sailboat structure. The boat heeling, rocking, pitching, or any other movement of the support structure cause an error in the anemometer. In the prior art the wind current generating means were pivoted about an axis that was perpendicular to the earth's surface.

SUMMARY OF THE INVENTION

It is therefore an important object of this invention to provide a simple and inexpensive device for giving wind direction with respect to the direction of travel of a sailboat, the device being mounted in an easy observable position for furnishing instantaneously critical comparative information to the helmsman.

Another object of the invention is to provide a sailboat gauge which will simultaneously and comparatively give the limits of the most advantageous steering of the boat while beating into the wind, both while on a tack and immediately after coming about.

It is a general object of this invention to overcome the deficiencies of the prior art relative to the wind direction means measurable or orientated with respect to a reference point and line such as the magnetic north azimuth.

The wind responsive means is freely spherically rotatable about the reference point. Yet another object of this invention is to provide a floating compass reference within the transparent spherical direction rotating means. The spherical direction rotating means is attached to the sailing structure my means of a loose pivot shape support structure means freely pivotable without any affect on the compass means within the sphere or rotatable sphere comprising the wind responsive means and weight means to balance the spherical rotating means.

The spherical mounting of the wind responsive means permits complete universal movement of the wind force direction and wind metering forces with respect to a specific reference point.

Another object of this invention is to provide a very low frictional characteristic between the elements for a more accurate determination of the true apparent wind force on a sailing vessel. Also the locating of the reference poly axial floating compass within the moving spherical structure at the center provides a low frictional characteristic between the wind responsive means and the reference compass. The invention uses an indicating means or reference point that is free of any movement of the mounting structure or sailboat.

Another object of the invention is to reduce the frictional surface to surface relationship between the wind direction indicating means and the support structure. The invention uses a minimal line contacting bearing surface with respect to the spherical rotatable wind direction means.

Another object of this invention is to orient the wind indicating means without any affect of the supporting structure. Also, an object of the invention is to orient the anemometer or wind speed indicating means directly into the main wind force.

The wind orienting means also can be used to support an electric current generating means that may be used to supply current for other uses. Orientating the electric current generating means into the true direction of the wind is more efficient.

These and other objects and advantages of my invention will more fully appear from the following description made in connection with the accompanying drawings wherein like reference characters refer to similar parts throughout the several views. Other objects and a fuller understanding of the invention may be had referring to the following description with the accompanying drawings.

DESCRIPTION OF THE PREFERRED EMBODIMENTS

To better understand the structural elements in the combination structure, reference will be made to imaginary axii and their intersection thereof.

X represents an imaginary axis for balancing the spherically rotatable transparent wind responsive indicating means with respect to the horizontal earth surface, stated in other words along the surface of the water body.

Y represents an imaginary axis for balancing the spherically rotatable transparent wind responsive indication means with respect to the vertical direction.

O represents the intersection of the X and Y axii, the apparent center of the rotational spherical transparent structure. When the elements are balanced, O is the obvious reference point about which the wind responsive means spherically rotates. Location of the wind responsive means as to the O center indicates the observable wind direction with respect to the reference point.

Figure 1:
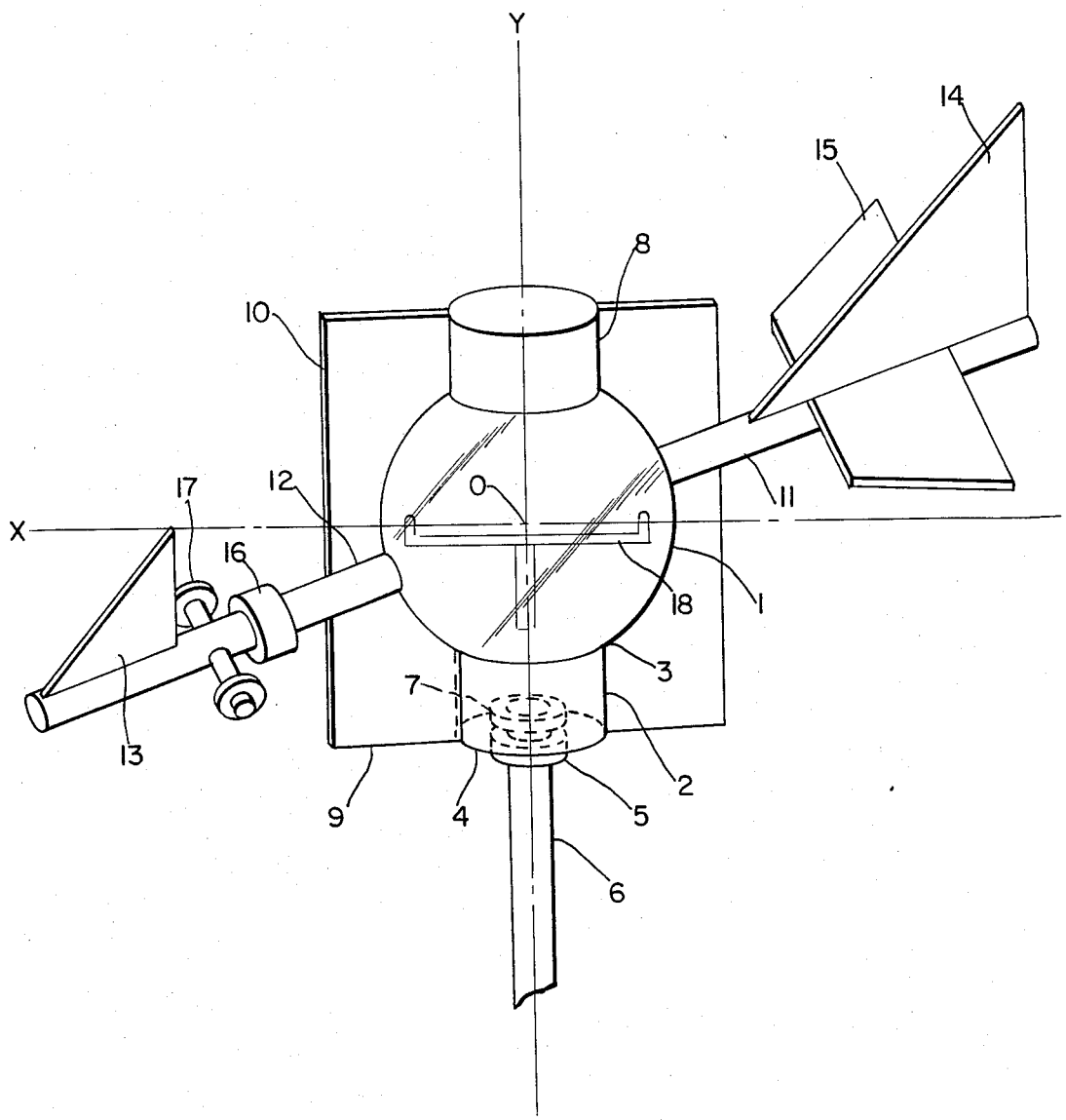
FIG. 1 is a perspective view of the spherically rotatable wind responsive indicating means constructed in accordance with the subject invention, wherein cylindrical bearing cup means is along the vertical axis for supporting a rotatable hollow transparent sphere having wind responsive means attached thereto. Within the hollow sphere is a freely movable floating compass means.

In FIG. 1 the critical structure of the invention is the spherical rotating transparent hollow structure sphere 1 that is supported in the bearing cylindrical cup member 2. The spherical rotating transparent sphere 1 has the imaginary axii X and Y intersecting at the rotational center O. The bearing cylindrical cup 2 contacts and supports the spherical structure 1 externally along a line type bearing means 3 at the lower one third of the sphere 1. The inner edge 3 of the cylindrical cup is the bearing means for the rotating transparent hollow sphere 1. The cylindrical cup 2 has a bottom surface 4 having an aperature 5 for mounting the cylindrical cup 2 upon a loose pivot means structure 6 with respect to the sailboat and along the Y axis. For security and safety purposes a pivot retaining means 7 is used to secure the cylindrical bearing cup when the boat heels or pitches in the extreme cases. In another embodiment a second bearing cylindrical cup 8 is used to secure the rotatable spherical structure 1 in aligned relationship to the bearing cylindrical cup 2. Cylindrical bearing cups 2 and 8 each have extending lugs or rods 9 attached to the upstanding sides of cylindrical surface. The lugs 9 extend beyond the diameter of the rotatable spherical structure 1. The two extending lugs 9 of each of the cylindrical bearing cups are connected vertically with a spring bias or elastic type bias means 10. The spring bias or elastic bias means 10 maintain the rotatable spherical structure 1 with respect and between the bearing cups 2 and 8 along the vertical or Y axis. Attached to the outer surface of spherical rotating transparent sphere 1 are two rods or tubular support means 11 and 12 extending along the X axis for supporting the weight balancing means 16 and 17 and wind responsive means comprising rudder 13 and wing type elevating means 14. The weight balancing means 16 and 17 have two components or elements. Element 16 is movable along the X axis and component or element 17 movable laterally to balance the structure to the horizontal plane. The rudder 13 and wing type structure 14 has to be balanced by the weight means 16 and 17 that the center O of the rotatable transparent spherical structure 1 is along the horizontal plane. The rudder 13 and wind responsive means will cause the spherical rotatable structure 1 to rotate in a circle of 360 degrees whose center is O. If the wind shifts or wind responsives are greater than 180 degrees the rod or tubular support means 11 and 12 cause the cylindrical bearing cups to rotate about the pivotal structure means 6. Therefore the spherical rotating structure 1 is independent of any pivotal or surface rotating means affected by the heeling or pitching or rocking of the boat structure. During the use of the structure, the specific location of the rod or tubular support means 11 and 12 with respect to the reference center point O gives the accurate wind direction based solely and resulting from the wind responsive means as the rudder and wing type elevating means.

The rotatable spherical structure 1 is transparent and hollow. The spherical structure 1 could be glass or plastic. The transparent hollow spherical structure has therein a floating liquid compass means that is used as a reference for the wind responsive means such as the rod or tubular means 11 and 12. Within the transparent sphere 1 is a liquid compass means 18. The magnetic indicating means 18 is orientated with respect to magnetic north by means of the magnets mounted therein. The magnetic indicating float means 18 is always for the reasons being afloat upon a surface or water surface and pointing north regardless of the rotating of the rotatable spherical structure 1. The magnetic floating compass indicating means 18 functions as a reference point for the wind responsive means mounted outside the rotatable spherical structure 1.

The floating compass indicating means 18 is not the novelty of this invention. The following floating compass indicating means of U.S. Pat. No. 3,956,831 and the floating compass indicating means of U.S. Pat. No. 3,068,583 and the floating compass indicating means of U.S. Pat. No. 3,286,358 are shown. Any type of floating compass indicating means may be used in the transparent rotatable spherical structure 1 as a reference for the wind responsive means visible through the transparent sphere.

The wing type elevating means is in the form of a wedge with the thin portion of the wedge facing the reference center 1 of the spherical rotating structure 1. The rudder 13 and wedge combination 14 could be forward of the center 1 of the spherical rotating structure 1.

The rudder 13 and wedge means 14 combination structure is connected to the spherical rotation structure 1 by offset means and the rudder and wedge responsive means are above the spherical rotating structure 1. The above offset mounting of the rudder and wind responsive means is free of any wind interference caused by the supporting structure.

A pair of rudder 13 and wedge 14 combination structure could be mounted in tandem along the rod or tubular support means 11 and 12.

Figure 2:
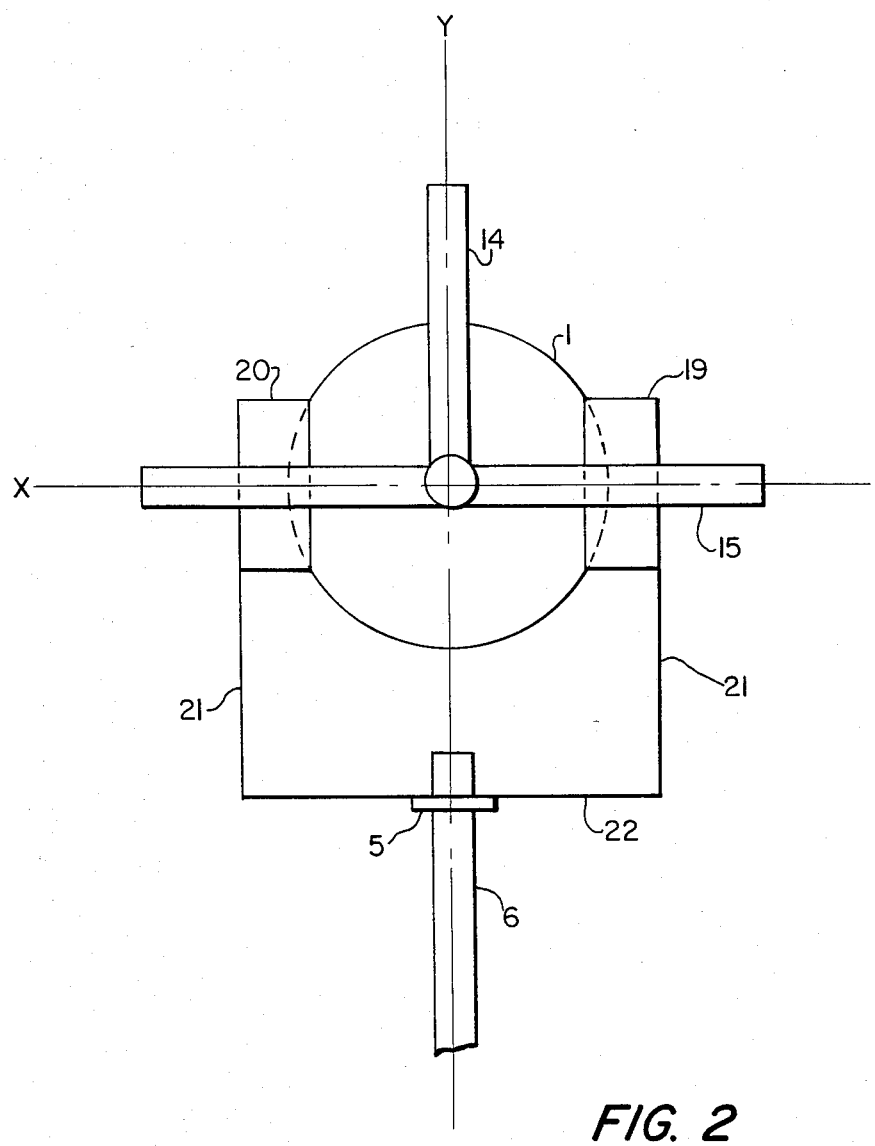
FIG. 2 is an elevational view of the wind responsive indicating means wherein a pair of cylindrical bearing cup means are along the horizontal axis for supporting the rotating sphere with its rudder and elevating means.

FIG. 2 shows side mounting of the spherical transparent rotating structure 1 by bearing cup means 2 along the horizontal axis. The bearing cup means 19 and 20 are mounted in base structure 22 by structure 21. Base 22 has an aperature for mounting base element 22 upon a loose pivot means structure 6 which is attached to the sailboat.

Figure 3:
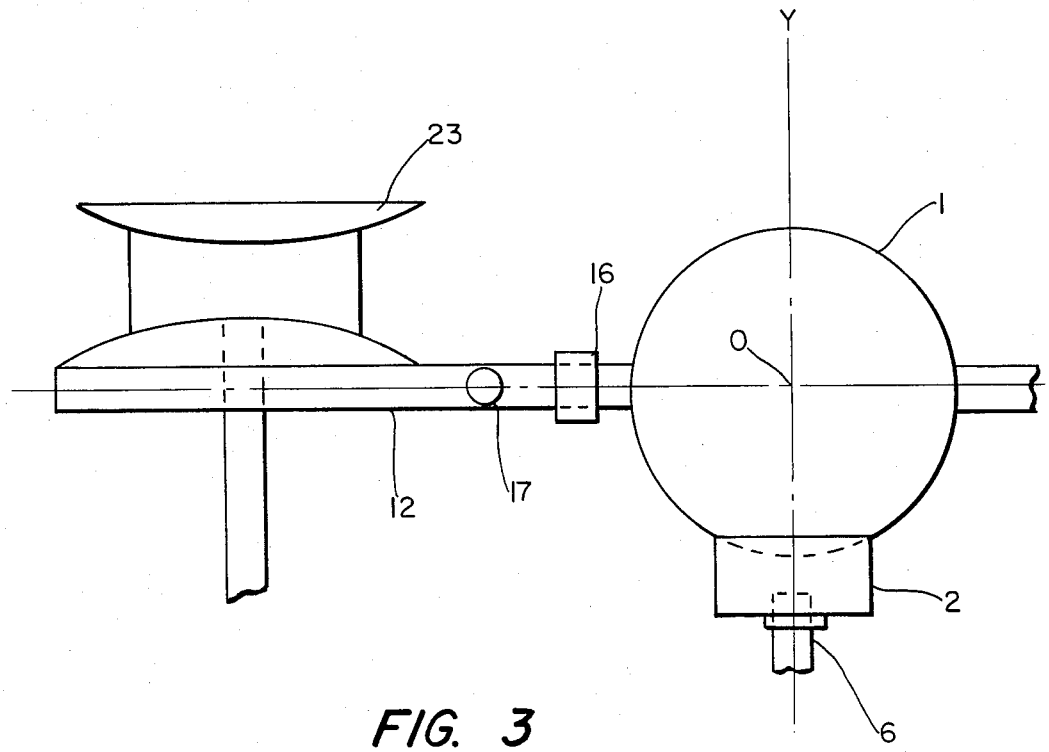
FIG. 3 is an elevational view of a wind speed meter mounted forward of the spherical rotating sphere to determine the wind speed or intensity of the wind using the structural means of U.S. Pat. No. 3,055,216. The wind speed meter forms a combination structure for determining the speed of the wind and apparent true direction.

FIG. 3 shows the wind speed meter of U.S. Pat. No. 3,055,216 mounted on the rod or tubular structural means 12 forward of the center 1 of rotation of the spherical rotating structure 1.

A cup type wind speed responsive means could be mounted on the rod or tubular structural means 12 forward of the center O of rotation of the spherical rotating structure 1. Other mechanical wind speed indicating means, such as the rotating speed or wind intensity meter of U.S. Pat. No. 914,959 could be mounted forward of the rod or tubular structural means 12.

The rotation of the propeller determines the wind velocity or wind speed by the measured current generated. The rudder 13 and wedge elevating means 14 combination points the center of the propeller axis towards the wind direction to be used to measure the wind intensity or wind speed components.

Figure 4:
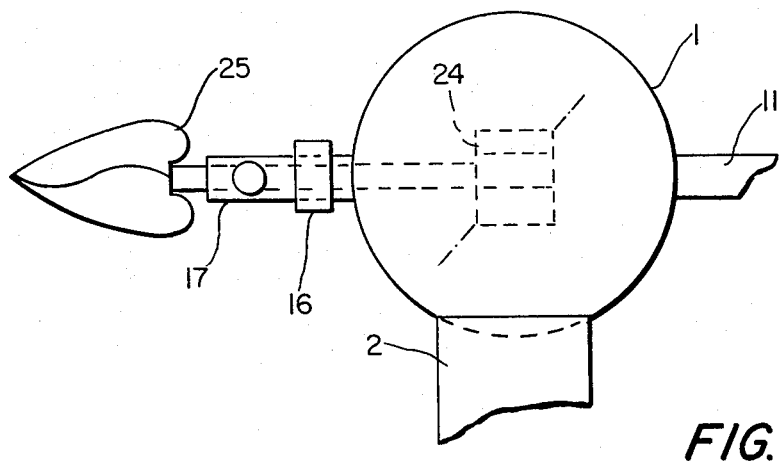
FIG. 4 is an elevational view of the wind force electrical generating means within the spherical rotating sphere indicating means mounted within the bearing cup means.

FIG. 4 shows the mechanical rotating propeller speed or wind intensity meter of U.S. Pat. No. 914,959 mounted internally on the spherical rotatable sphere structure 1 supported in bearing cup 2. The spherical rotatable sphere also has a rudder means 13 and wind type elevating or wedge means 14 and weight balancing means 16 and 17. The rudder 13 and elevating wedge means 14 combination structure is used to point the electric current generating means 24 into the major combination of forces of the apparent wind with respect to the reference point O.

The rudder means 13 and elevating wedge means 14 combination structure also is used to point the wind intensity or wind speed meter into the major combination of forces of the apparent wind with respect to the reference point O or magnetic azimuth. The rudder preferable is made of flat type ridged smooth surface material such as paper, plastic, or metal. The wing type elevating means or wedge means 14 may be of paper, plastic, or metal. For the rudder means 13 and the wing type elevating means 14 for light wind operations feathers may be substituted, such as turkey or goose or other rigid type feathers.

The wind forces act on the following described elements that are movable and respond to the direction of the wind. The wind responsive and indicating means comprise the freely rotatable transparent sphere 1 having a support structure means 11 and 12, for a rudder means 13 and wing type elevating means 14. The rudder responds to the horizontal direction of the wind to cause the sphere 1 to move in the bearing cup 2. The wing type elevating means 14 in response to the woind force causes the sphere 1 to turn in the bearing cup along a vertical plane. The sphere 1 is freely rotatable in all directions in bearing cup 2. Only wind forces of varying direction cause the wind responsive and indicating means to move in the bearing cup 2. No orientational movement of the boat supported bearing cup 2 is transmitted to the freely rotatable sphere 1. The weight means is used to balance the rotatable movement of the transparent sphere 1 in the boat supported pivotable bearing cup 2. The pivotable bearing cup 2 is the structure used to support the wind responsive and indicating means on the sailboat. Bearing cup 2 is permitted to pivotably move about the y axis or about the pivot means 6.

Within the freely spherical rotatable transparent sphere 1 is located a freely floatable liquid compass means 18 that responds to the magnetic direction of nature. Movement of the magnetic compass 18 within sphere 1 is independent from any orientational movement of the sphere 1 in the bearing cup 2. The magnetic compass acts as a reference point and is located at the center of the movable rotatable sphere 1. Also, no orientational movement is transmitted to the magnetic floatable liquid compass means 18. Orientational movement of element 18 within sphere 1 and of structure external to the sphere 1 are all independent of each other.

The freely spherical rotatable sphere 1 is moved by wind force components. The internally floating compass means 18 is moved solely by forces of nature such as the magnetic forces. The floating compass means 18 movement is independent of the wind force component movement or the boat heeling, rocking, pitching or any other support movement.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist.

I claim:

1. Spherically rotatable wind direction indicator comprising a support structure including a supported pivotable hollow cylindrical bearing cup means (2) with a wind force responsive and indicating means comprising an independent rotatable transparent hollow sphere (1), nestled within said bearing cup means (2) and with attached rod support means (11 and 12) for supporting a directional rudder (13) and wind type elevating means (14) and a weight balancing means (16 and 17) for balancing the rudder and wing type elevating means along imaginary horizontal and vertical axes, said rotatable transparent sphere being independently rotatable in movement regardless of the mounting of said sphere within the support structure.

2. Spherically rotatable wind direction indicator as set forth in claim 1, wherein the said pivotable cylindrical bearing cup means (2) opposite the bearing surface (3) therein is provided an aperature (5) for mounting the pivotable cylindrical bearing cup (2) onto a loose pivot support means (6).

3. Spherically rotatable wind direction indicator as set forth in claim 1 wherein the independent hollow rotatable transparent sphere (1) mounted therein an independent movable floating liquid compass means (18).

4. Spherically rotatable wind direction indicator as set forth in claim 2 wherein a second non-pivotable cylindrical bearing cup means (8) is supported above and about the independent hollow rotatable transparent sphere (1) and connected to the said pivotable cylindrical bearing cup means (2) by an elastic type bias means (10).

5. Spherically rotatable wind direction indicator as set forth in claim 1, wherein also mounted on rod support means (12) a wind speed meter means (23).

6. Spherically rotatable wind directional indicator as set forth in claim 1, wherein the independent hollow rotatable sphere (1) mounted therein an electric current generating means (24).

7. Spherically rotatable wind direction indicator comprising a base structure (22) having mounted thereon structural elements (21) and a pair of hollow cup means (19 and 20) in side by side relationship, said bearing cup means (19 and 20) mounting a freely independently rotatable hollow transparent sphere means (1) with attached rod support means (11 and 12) for supporting a directional rudder (13) and wing type elevating means (14) and weight balancing means (16 and 17) for balancing the rudder and wing type elevating means along imaginary horizontal and vertical axes, said base structure (22) including an aperture for mounting said base structure upon support means (6), said rotatable transparent sphere means being independently rotatable regardless of the mounting of said sphere in said base structure.

8. Spherically rotatable wind direction indicator as set forth in claim 7, wherein mounted within the freely rotatable hollow transparent sphere means (1) is an independent liquid floating type compass means (18).

9. Spherically rotatable wind direction indicator as set forth in claim 7, wherein the independent hollow rotatable sphere (1) has mounted therein an electric current generating means (24).

* * * * *